Figure 1:
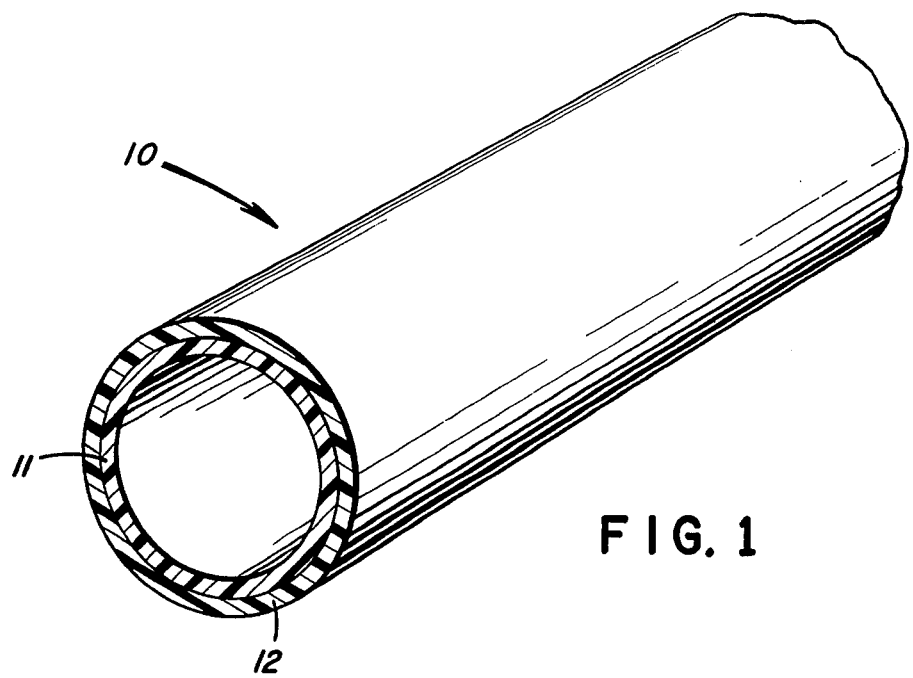

United States Patent [19]
Stine et al.

[11] 4,101,699
[45] Jul. 18, 1978

[54] SYNTHETIC RESINOUS TUBE

[75] Inventors: Clifford R. Stine, Solon; Jennings A. Boyce, Ravenna, both of Ohio

[73] Assignee: Samuel Moore & Company, Mantua, Ohio

[21] Appl. No.: 418,204

[22] Filed: Nov. 23, 1973

[51] Int. Cl.$^2$ .................. B29F 3/10; B32B 31/30; B32B 27/32
[52] U.S. Cl. ........................... 428/36; 138/141; 138/177; 138/DIG. 7; 264/22; 264/25; 264/173; 264/230; 264/DIG. 45; 264/DIG. 71; 428/212; 428/517; 428/521; 428/523
[58] Field of Search ............... 264/22, 25, 173, 230, 264/DIG. 45, DIG. 71; 138/140, 141, 177, 178, DIG. 7; 161/139, 166, 178, 412; 428/35, 36, 212, 516, 517, 519, 521, 523

[56] References Cited
U.S. PATENT DOCUMENTS

| | | | |
|---|---|---|---|
| 3,033,238 | 5/1962 | Kosewicz | 138/141 |
| 3,253,619 | 5/1966 | Cook et al. | 264/230 |
| 3,387,065 | 6/1968 | Derbyshire et al. | 264/22 |
| 3,396,460 | 8/1968 | Wetmore | 264/230 |
| 3,448,182 | 6/1969 | Derbyshire et al. | 264/22 |
| 3,597,372 | 8/1971 | Cook | 264/230 |
| 3,819,792 | 6/1974 | Ono et al. | 264/173 |

Primary Examiner—Harold Ansher
Assistant Examiner—Daniel R. Zirker
Attorney, Agent, or Firm—Clelle W. Upchurch

[57] ABSTRACT

A synthetic resinous tube having a plurality of bonded coaxial layers with at least one layer being thermoplastic and another substantially non-thermoplastic is formed by the simultaneous coaxial extrusion of thermoplastic tubes and electron irradiation of one of the layers of the tube to convert it from a thermoplastic resin.

1 Claim, 2 Drawing Figures

U.S. Patent     July 18, 1978     4,101,699

SYNTHETIC RESINOUS TUBE

This invention relates generally to a plastic or synthetic resinous tube having coaxial contiguous thermoplastic and substantially non-thermoplastic or thermosetting layers.

Tubing prepared by extruding a synthetic resin is used extensively for fluid transmission. The selection of a resin for a particular tube is made not only with the composition of the fluid in mind but also only after considering the temperature and other characteristics of the environment to which the tubing will be exposed. While many extrudable thermoplastic resins have relatively good chemical resistance, their stability at high temperature is poor.

It has been proposed before, for example, in the Brumbach patent U.S. Pat. No. 2,971,538 and in U.S. Pat. No. 3,561,493, to extrude simultaneously a plurality of contiguous coaxial tubes of different plastic materials in order to provide an improved product for conveying some fluids under particular conditions. Some of the physical properties of the inner surface of such a composite tube can be different from those of the outer surface. However, these heretofore available tubes have the problem that all of the layers thereof are thermoplastic and thus the differences in physical properties between the surfaces thereof are limited.

It has also been proposed heretofore to cross-link thermoplastic resins by exposure to an electron beam. The physical properties of the resins are changed by such exposure because of the cross-linking. As pointed out in the copending application Ser. No. 328,366 filed Jan. 31, 1973 by Stine et al, tubing having improved characteristics for fluid transmission purposes are obtained by exposure of a thermoplastic tube to an effective dosage of high energy electrons.

It is an object of this invention to provide a composite tubing having contiguous layers of synthetic resins which has improved physical properties for fluid transmission purposes. Another object of the invention is to provide a method for making an improved composite tube having contiguous coaxially extruded layers of different physical properties. Still another object of the invention is to provide a composite tube having contiguous layers of synthetic resin having improved stability at high temperatures.

Figure 2:
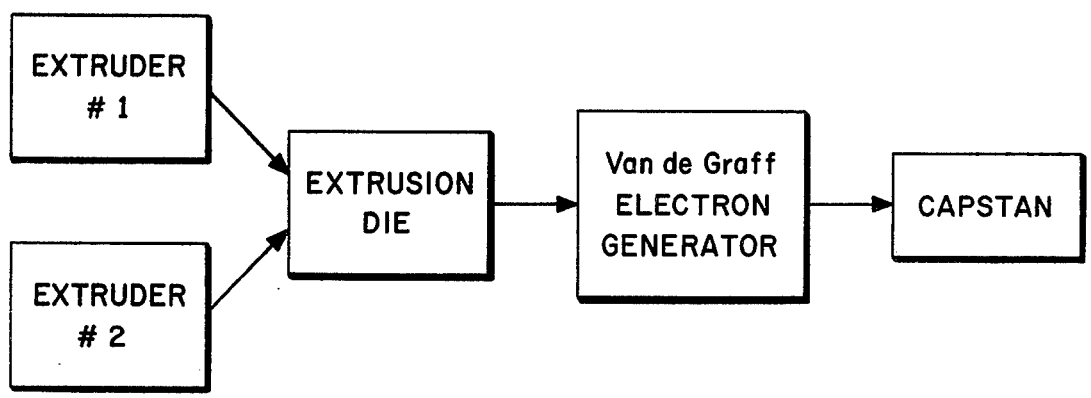

Other objects will become apparent from the following description with reference to the accompanying drawing wherein FIG. 1 is a fragmentary perspective view of an embodiment of the invention; and FIG. 2 is a diagrammatic representation of an embodiment of the process provided by the invention.

The foregoing objects and others are accomplished in accordance with this invention, generally speaking, by providing tubes having a plurality of extruded, bonded contiguous coaxial layers of a synthetic resin in which one of the layers is thermoplastic and the other is substantially non-thermoplastic. The tube provided by the invention is manufactured by simultaneously coaxially extruding two tubes, one over the other in contiguous relationship with one of the tubes being of a composition which is susceptible to cross-linking by electron irradiation and another of the layers being substantially non-susceptible to cross-linking by electron irradiation and exposing the resulting composite tube to electron irradiation until cross-linking of the cross-linkable resin takes place. The simultaneous extrusion of two or more plastics to form contiguous coaxial tubes may be performed by known methods with already available apparatus having concentric extrusion dies and a separate extruder for supplying the die with each resinous material. The extruded tube may be irradiated immediately after extrusion or it may be wound on a reel and later unrolled and exposed to electron irradiation.

Any apparatus adapted to produce electrons having a high kinetic energy of say, for example, at least about 100,000 electron volts may be used to cure or cross-link the uncured but cureable layer or layers of the tube. Such apparatus is commercially available. For example, an electron accelerator such as a Van de Graff electron generator may be used. The exposure of the composite tube to electron bombardment is to be controlled until sufficient cross-linking of the cureable resin layer has occurred to impart the desired physical properties thereto.

Referring now to the drawing, one embodiment of a composite tube 10 provided by the invention has an inner laminae 11 of linear polyethylene and an outer laminae 12 of cross-linked chlorosulfonated polyethylene. Tube 10 may be prepared by simultaneously extruding a polyethylene composition which does not contain a radiation sensitizer to improve its susceptibility to curing or cross-linking by electron bombardment and a chlorosulfonated resin which can be cross-linked by irradiation.

As illustrated in FIG. 2, polyethylene may be supplied to the cavity of an extrusion die by one extruder and the chlorosulfonated polyethylene may be supplied to the cavity of the die from a second extruder. The extruded tube 10 may then be exposed to electron bombardment by a Van de Graff electron generator producing electrons having a kinetic energy of 1 Mev. at a dosage of 15 Mrads. The outer lamina 12 but not the inner lamina 11 will be cured and have improved heat resistance. Composite hose 10 may now be wound on the spindle of a suitable reel for storage.

Although a composite tube having only two laminations is usually sufficient to impart the desired physical characteristics to the tube, the invention in its broader aspects contemplates a tube having two or more laminae. The number of laminae in the tube wall can be determined by the number of concentric die cavities and the number of extruders used to supply different resinous compositions thereto. Because the resin is fused at the time it is extruded, the two or more laminae of the tube wall are in most instances cohesively bonded together without an intermediate adhesive. However, if two different resins are used which are so incompatible that they will not become bonded together, a mutually compatible resin may be extruded therebetween to serve as an adhesive.

Any combination of resins which are extrudable on conventional tube extruding apparatus and which are compatible or can be otherwise bonded together may be used in making the tube provided by this invention. Moreover, lamina 11 of tube 10 may be the one which is cross-linked and lamina 12 may be the one which does not become cross-linked when the tube 10 is exposed to electron bombardment. Any suitable resin which can be extruded and then cross-linked by electron bombardment may be used for the cross-linkable lamina of the composite tube. Suitable resins for making the non-cross-linkable lamina of the tube include, for example, non-cross-linkable polyamides, polyethylene, polypropylene, polyesters, polyurethanes, and the like.

An anti-rad may be added to the resin to prevent it from cross-linking when the tube is exposed to electron irradiation. For example, benzoquinone, p-phenylene diamine, or a phenolic anti-oxidant may be included in the resin composition extruded to form the non-cross-linkable lamina.

Any suitable cross-linkable polyolefin such as polyethylene or copolymers containing ethylene may be used. A material which sensitizes the resin to electron erradiation may be added to the composition. One suitable copolymer or ethylene is an ethylene-propylene-diene polymer such as ethylene-propylene-hexadiene. A suitable poly-ethylene-propylene-1,4 hexadiene polymer is available from E. I. duPont de Nemours and Company under the trademark "NORDEL". Another suitable polyolefin is a poly(ethylene-propylene-ethylidene norbornene) polymer. Commercial polymers of the latter type are available commercially from the copolymer Rubber and Chemical Corporation under the trademark "EPsyn." An unsaturated polyester adapted to be cross-linked by irradiaion can be prepared by esterifying a suitable unsaturated polycarboxylic acid with a polyhydric alcohol. For example, the polyester can include groupings derived from maleic acid or similarly unsaturated acid. Alternately, an unsaturated alcohol such as butene can be used with a saturated dicarboxylic acid such as adipic acid in making the polyester to provide unsaturation for cross-linking purposes. The cross-linkable laminae may also be made from a vinyl compound. Cross-linkable polyvinylchloride, polyvinylchloride-acetate, polyurethane or the like may be used. Of the various suitable materials for making the cross-linkable laminae, best results have been obtained so far with chlorosulfonated polyethylene so a tube having a lamina of cross-linked chlorosulfonated polyethylene is preferred. Because of its resistance to chemicals, Hytrel (a polyester sold by duPont under the Hytrel trade mark) is a preferred material for making a non-cross-linkable lamina. Nylon may be used for making either the non-cross-linkable lamina and it may be used for making the cross-linkable lamina provided that a suitable sensitizer is included in the nylon to render it susceptible. to efficient cross-linking by irradiation. One of the polyolefins, such as polyethylene, polypropylene or polybutylene, may be used to make the cross-linkable lamina provided sufficient sensitizer is included in the composition to render it cross-linkable efficiently by irradiation. Suitable sensitizers include benzophenone, trimethylol propane, acrylates and methacrylates such as trimethacrylate, m-phenylene dimaleimide and the like.

Preferred combinations for making a tube having a chemical resistant inner surface and a heat stable outer wall include a polyethylene inner lamina and a chlorosulfonated polyethylene (Hypalon) outer lamina, a Hytrel inner lamina and chlorosulfonated polyethylene outer lamina, a Hytrel inner lamina and a chlorinated polyethylene outer lamina, a chlorinated polyethylene inner lamina and a polyvinylchloride outer lamina, or a Hytrel inner lamina and a polyvinylchloride outer lamina. Hytrel is believed to be a polytetramethylene ether glycol-terephthalic acid polyester marketed by E. I. duPont de Nemours and Company. Such a polyester may be prepared by polymerizing tetrahydrofuran and then using the resulting glycol as the alcohol in an esterification process with terephthalic acid. By proper selection of the combination of resins used in making the tube provided by this invention, tubing adapted to carry corrosive fluids and having improved physical characteristics such as high strength, high temperature resistance, resistance to radiation, oil resistance and ozone resistance can be prepared. The tubing provided by the invention is particularly advantageous for use in industrial power plants such as nuclear reactors, and for the transmission of fluids in chemical processing plants. Since high temperature curing is avoided in accordance with the invention, the tubing can be prepared by mass production techniques and efficient and rapid manner. Moreover, the tubing provided by the invention may have a relatively thin wall of say 10 mils or less if desired with a substantially uniform wall thickness with dimensional stability. A poly(ethylene-propylene-dicyclopentadiene) polymer such as the one sold under the tradename "Royalene" by United States Rubber Company may be used. Also, blends or mixtures of two or more curable but uncured polymers may be used for the laminae of the tube to be cross-linked. Likewise, blends or mixtures of non-curable thermoplastic resins may be used to make the lamina of the tube which is not to become cross-linked during the irradiation step of the process.

As presently available commercially, poly(ethylene-propylene-diene) polymers having the aforesaid initial and final characteristics, per se, lack the needed hardness and tensile modulus to give the desired shape and dimension stability for an extruded tube so it is advantageous to fill and reinforce them with a reinforcing filler material in preparing the uncured polymer compositions to be extruded. The filler material acts as a hardening and reinforcing agent. The amount of reinforcing filler should be sufficient to provide a total composition with a minimum hardness of at least Shore 45A, preferably 80 - 95 Shore A, and a minimum tensile modulus (tensile strength at 100% elongation) of at least 300 p.s.i. It has been found that suitable reinforcing filler concentrations, by weight, for use with a poly(ethylene-propylene-diene) polymer are from 50 parts per 100 parts of base polymer to 250 parts per 100 parts of base polymer. Kaolin clay is preferred as a reinforcing filler material in preparing the desired poly(ethylene-propylene-diene) compositions with a particularly preferred form of filler material being kaolin clay surface-coated with vinyl silane. The preferred filler concentration, by weight for the kaolin clay coated with the silane is from 100 parts per 100 parts of base polymer to 200 parts per 100 parts of base polymer. The preferred reinforcing filler may be obtained commercially from the Burgess Pigment Company under the trade designation BURGESS KE clay.

In the invention, other reinforcing filler materials which may be useful (together with their trade designations and sources) include: calcinated clay, or partially hydrated aluminum (III) silicate, (WHITEX from Freeport Kaolin Co.); FEF carbon black (Statex FT from Cities Service Company); hard clay, or hydrated aluminum (III) silicate, (SUPREX from J.M. Huber Corp.); SRF carbon black (—); zinc (II) oxide (ST. JOE 20 from Harwick Standard Chemical Company) talc, or hydrous magnesium (II) silicate, (MISTRON VAPOR from Sierra Talc Co.); FT carbon black (—); litharge, or lead (II) oxide, (TLD-90 from Wyrough & Loser, Inc.); red lead (—); and TRANSLINK-37 clay (TRANSLINK-37 from Freeport Kaolin Co.). In addition, polymeric hardening and reinforcing agents such as a low density polyethylene polymer having a maximum density of about 0.940 grams per centimeter (see Modern Plastics Encyclopedia - 1966, Vol. 43, No. 1A, p. 264, Table 1), may preferably be used. Suitable low density polyethylene (0.916 grams per cubic centimeter) may be commercially obtained from the Union Carbide Corp. under the trade designation DYNH-3 ("DYNH" being a Union Carbide trademark). The low density polyethylene is preferably used in a concentration, by weight, of 20 to 30 parts per 100 parts of base polymer.

It may be preferable to incorporate a plasticizing material, such as a processing lubricant, or processing aid, in the uncured olefinic terpolymer composition. Suitable plasticizer concentrations, by weight, for use in the composition are from about a trace per 100 parts of base polymer to 100 parts per 100 parts of base polymer. A preferred plasticizer is vinyl silane. It may be commercially obtained from Union Carbide under the trade designation vinyl silane A-172. It is preferably used in a concentration, by weight, of about 1 part per 100 parts of the base polymer. Additional plasticizers, (together with their trade designations and sources) which may be useful:

paraffinic oil (SUNPAR 2280 and SUNPAR 150 from Sun Oil Company), process oil (CIRCO from Sun Oil Company), and paraffin.

Use of a blend of poly(ethylene-propylene-diene) polymers can provide some plasticizing effect to the uncured olefinic terpolymer composition.

The uncured olefinic terpolymer composition may preferably include an anti-oxidant material in a concentration, by weight, from about 0.5 parts per 100 parts of base polymer to about 2.5 parts per 100 parts of base polymer. A preferred anti-oxidant material is poly(trimethyl-dihydroquinoline) which is commercially available from R. T. Vanderbilt Company under the trade designation AGERITE Resin D ("AGERITE" being a trademark). Also, the uncured olefinic terpolymer composition may preferably include a thermal stabilizing material in a concentration, by weight, from about 5 parts per 100 parts of base polymer to about 20 parts per 100 parts of base polymer. A preferred thermal stabilizer is zinc oxide which is also useful as a reinforcing filler and which may be obtained from Harwick Standard Chemical Company under the trade mark designation ST. JOE 20. In addition, the uncured olefinic terpolymer composition may preferably include a radiation sensitizer.

Any suitable halosulfonated homopolymer composition may be used, but a chlorosulfonated polyethylene composition is preferred. The base polymer component of the composition is a chlorosulfonated polyethylene polymer having the aforesaid initial and final characteristics. A preferred chlorosulfonated polyethylene polymer is commercially available from E. I. duPont de Nemours & Co. under the trade designations HYPALON 20, HYPALON 30, HYPALON 40s, HYPALON 40, HYPALON 40 HV, HYPALON 45 and HYPALON 48 ("HYPALON" being a duPont trademark).

Since, as presently commercially available, chlorosulfonated polyethylene polymers, per se, lack the needed hardness and tensile modulus to give the desired shape and dimension stability (as is also the case with commercial poly(ethylenepropylene-diene) polymers) for making a composite tube, it is desirable to add a reinforcing filler material in preparing the chlorosulfonated polyethylene compositions of the present invention. The amount of reinforcing filler should be sufficient to provide a total composition with a minimum hardness of at least Shore 60A and a minimum tensile modulus (tensile strength at 100% elongation) of at least 300 p.s.i. Suitable reinforcing filler concentrations, by weight, for use with a chlorosulfonated polyethylene polymer are from 5 parts per 100 parts of base polymer to 250 parts per 100 parts of base polymer. The preferred concentration range is from 5 parts per 100 parts of base polymer to 50 parts per 100 parts of base polymer. Litharge, or lead (II) oxide, is preferred as a reinforcing filler material in preparing the desired chlorosulfonated polyethylene compositions. It may be commercially obtained under the trade designation TLD-90 from Wyrough & Loser, Inc. Preferred reinforcing fillers and their preferred range of concentration, by weight, expressed in parts of plasticizer to 100 parts of base polymer (together with trade designations and sources) include:

calcined clay, or partially hydrated aluminum (III) silicate, from 5 to 25 (WHITEX from Freeport Kaolin Co.);

FEF carbon block from 5 to 35 (STATEX FT from Cities Service Company);

MT carbon black from 5 to 25 (STATEX MT from Cities Service Company);

hydrated alumina, or hydrated aluminum (III) oxide, from 5 to 50 (HYDRAL 710 from Aluminum Co. of America); and antimony (III) trioxide from 5 to 20 (THERMO GARD S from M&T Chemicals).

Additional reinforcing filler materials which may be useful (together with their trade designations and sources) are: silica, or silicon (II) dioxide, (H1 S1L 233 from PPG Industries, Inc.); hard clay, or hydrated aluminum (III) silicate, (SUPEREX from J. M. Huber Corp.); magnesia, or magnesium (II) oxide, (MAGLITE D from Merck & Co., Inc.); precipitated whiting (CALCENE TM from PPG industries, Inc.); soft clay, or hydrated aluminum (III) silicate, (McNAMEE from R. T. Vanderbilt Co., Inc.); SRF carbon black (—); water ground whiting, or calcium (II) carbonate, (ATOMITE from Thompson-Whenman & Co.); titanium (IV) dioxide (R-902 from E. I. duPont de Nemours & Co.); zinc (II) oxide (ST. JOE 20 from Harwick Standard Chemical Company); talc, or hydrous magnesium (II) silicate, (MISTRON VAPOR from Sierra Talc Co.).

In the invention, it may be preferable to incorporate a lubricant, such as a processing plasticizer or processing aid, in the uncured halosulfonated polyolefin composition. Appropriate plasticizer concentrations, by weight, for use in the compositions are from a trace per 100 parts of base polymer to 100 parts per 100 parts of base polymer. Preferred plasticizers and their preferred range of concentration, by weight, expressed in parts of plasticizer to 100 parts of base polymer (together with trade designations and sources) include:

chlorinated paraffin from 5 to 20 (CHLOROWAX 70-S and CHLOROWAX-LV from Diamond Shamrock Co.), polymeric hydrocarbon from 5 to 20 (KENFLEX A from Kenrich Petrochemical Co.), aromatic process oil from 5 to 20 (SUNDEX 790 from Sun Oil Company), and comarone - indene resin from 5 to 20, (CUMAR MH 2-½ from Neville Chemical Company).

Additional plasticizers which may be useful include the polyester plasticizer (HARFLEX 300 from Wallace and Tiernan, Inc.).

The uncured halosulfonated polyolefin composition may also preferably include a water stabilizing and acid acceptor, such as the aforesaid litharge. The litharge is preferably used in a dispersion form in a concentration, by weight, from a trace per 100 parts of base polymer to 45 parts per 100 parts of base polymer. Also, the uncured halosulfonated polyolefin composition may preferably include a radiation sensitizer. A preferred radiation sensitizer is m-phenylene dimaleimide (HVA-2 from E. I. duPont de Nemours & Co.) which is preferably used in a concentration, by weight, from a trace per 100 parts of base polymer to three parts per 100 parts of base polymer.

The initial components of the desired foregoing uncured polymer composition is blended to uniformly distribute its components into a uniform composition (A-1, FIG. 2). This is preferably done by first mixing the respective components of the composition first in an intensive internal batch mixer having sigma blades, such as a BANBURY mixer, ("BANBURY" being a trademark of Farrel Corp.) in order to flux the components at a high temperature and then continuing the mixing by masticating the mixture on an open mill, such as a two-roll mill, which also converts the lump form discharged by the batch mixer into a strip form. After open milling, the composition can be optionally sieved to mechanically remove physical impurities and undesired lumps. The milled composition is stripped from the mill in sheet, or strip, form and passed through a water bath to cool it. After cooling, it is subjected to an air wipe to remove or strip retained water. Finally, the composition is physically subdivided into dice or pellets by feeding the strip into either a dicing machine or a pelletizing machine. In its subdivided form, the composition is a flowable solid having an extended storage life at room temperature. However, the pellets or dice can be stored at room temperature until required, as desired.

The composition, in its subdivided form as a flowable solid, is fed into a thermoplastic extruder which fuses the subdivided composition into a plastic fluid under compressive and sheer stress and externally applied heat.

In the thermoplastic extrusion of the present invention, production speed can be increased by increasing melt temperature and thereby decreasing melt viscosity. External heat increases the melt temperature above that obtainable from internal work heat alone. The ratio of external heat to inheat is from approximately 0.2:/1 to approximately 0.3:/1 and possibly as high as 0.5:/1. If desired, scrap from the extruder can be re-extruded and used without significant change in melt rheology or physical properties of the composition being extruded. In view of the high melt temperatures and long residence time in the extruder, it is preferable to exclude or minimize chemical curing agents or initiators from this composition used in the present invention.

It is more practical to store the uncured composite tube before passing it through the irradiating step of the process, the uncured composite tube may be wound on the spindle of a suitable reel after it has been extruded and sized. Later when it is desired to cross-link the cross-linkable laminae, the composite tube may be conveyed under an electron beam by paying off the tubing from its storage reel with a pay-off mechanism, transporting it under the beam in an orientation which optimizes exposure to the beam with a transport mechanism, and respooling the radiation-cured final composite tubing into a storage reel with a respooling mechanism.

The cross-linked composite tubing provided by the method of the invention has a flexible, relatively thin walled continuous construction of indeterminate length which has a longitudinally extending bore therethrough. The composition of the resin used to make the cross-linkable laminae may be so chosen as to provide a cross-linked laminae having a Shore A hardness of 50 or more, a tensile modulus at 100% elongation of at least 400 pounds per square inch.

Although the invention has been described in detail for the purpose of illustration, it is to be understood that such detail is solely for that purpose and that those skilled in the art can make variations therein without departing from the spirit and scope of the invention except as it may be limited by the claims.

The embodiments of the invention in which an exclusive property or privilege is claimed are defined as follows:

1. A dimensionally stable tube having a plurality of layers of different polymeric materials cohesively bonded together, said tube having been made by the method comprising simultaneously coaxially extruding a plurality of contiguous tubular layers of different fuse bondable thermoplastic polymeric materials, at least one of the layers being susceptible to cross-linking by electron irradiation and at least one layer being substantially nonsusceptible to cross-linking by electron irradiation, and irradiating the resulting tube until cross-linking of the susceptible thermoplastic layer has progressed to a point where the said susceptible layer is substantially non-thermoplastic, wherein the at least one layer which is susceptible to cross-linking is an ethylene-propylene-diene terpolymer composition and the at least one layer which is substantially non-susceptible to cross-linking is a polyethylene composition.

* * * * *